United States Patent [19]
Seki et al.

[11] Patent Number: 5,634,664
[45] Date of Patent: Jun. 3, 1997

[54] SAFETY SEAT BELT DEVICE

[75] Inventors: Kazuhiro Seki; Yasuki Motozawa, both of Saitama, Japan

[73] Assignee: Honda Giken Kogyo Kabushiki Kaisha, Japan

[21] Appl. No.: 591,086

[22] Filed: Jan. 25, 1996

Related U.S. Application Data

[63] Continuation of Ser. No. 294,984, Aug. 24, 1994, abandoned.

[30] Foreign Application Priority Data

Aug. 24, 1993 [JP] Japan ..................... 5-209500
Jul. 13, 1994 [JP] Japan ..................... 6-161530

[51] Int. Cl.$^6$ ..................................... B60R 22/34
[52] U.S. Cl. ................... 280/806; 280/808; 297/477
[58] Field of Search ..................... 280/801.1, 806, 280/807, 808; 297/483, 474, 476, 477, 479, 480

[56] References Cited

U.S. PATENT DOCUMENTS

| | | | |
|---|---|---|---|
| 3,550,875 | 12/1970 | Settimi | 280/807 |
| 3,606,454 | 9/1971 | Dorn | 297/483 |
| 3,848,888 | 11/1974 | Kazaoka et al. | 280/807 |
| 3,908,928 | 9/1975 | Okada | 280/807 |
| 4,398,680 | 8/1983 | Ogawa et al. | 242/107.2 |
| 4,480,804 | 11/1984 | Ando | 242/107.2 |
| 4,817,754 | 4/1989 | Muramoto | 180/268 |
| 4,991,874 | 2/1991 | Tsuge et al. | 280/806 |
| 5,042,738 | 8/1991 | Mori | 242/107.4 B |
| 5,295,714 | 3/1994 | Föhl | 280/806 |

*Primary Examiner*—Kenneth R. Rice
*Attorney, Agent, or Firm*—Merchant, Gould, Smith, Edell, Welter & Schmidt

[57] ABSTRACT

A safety seat belt device for use in a motor vehicle has a seal belt for constraining an occupant of the motor vehicle. The seat belt includes a shoulder belt portion for extending across the thorax of the occupant and a lap belt portion for extending across the lower waist of the occupant. The safety seat belt device also includes a lock device for locking both the shoulder belt portion and the lap belt portion when the motor vehicle undergoes a forward or rearward collision, and locking only the lap belt portion when the motor vehicle undergoes a lateral collision. The lock device may include a lock mechanism for locking the shoulder belt portion upon a forward or rearward collision, and a lock mechanism for locking the lap belt portion immediately when the seat belt is fastened by the occupant regardless of whether the motor vehicle suffers a lateral collision or not.

8 Claims, 12 Drawing Sheets

SAFETY SEAT BELT DEVICE

This is a continuation of applications Ser. No. 08/294,984, filed Aug. 24, 1994, now abandoned.

BACKGROUND OF THE INVENTION

1. Field of the Invention

The present invention relates to a safety seat belt device for use in motor vehicles, and more particularly to a safety seat belt device comprising a lap and diagonal seat belt.

2. Description of the Prior Art

There has been known a safety seat belt device having a lap and diagonal seat belt for use in motor vehicles. In the known safety seat belt device, the seat belt extends upwardly from a retractor and passes through a through anchor. The seat belt has a distal end fixed to a vehicle body floor by an anchor, and an intermediate region inserted through a tongue. When the tongue is inserted in a buckle on the vehicle body floor, the seat belt has a shoulder belt portion extending diagonally across the thorax of the occupant between the through anchor and the tongue, and a lap belt portion extending across the lower waist or hip of the occupant between the tongue and the anchor.

When the seat belt is subjected to an abrupt tensile force upon a collision of the motor vehicle, the seat belt is prevented from being pulled out by a lock mechanism combined with the retractor for thereby holding the occupant from being thrown forward.

Motor vehicles may collide with another motor vehicle or object forward or rearward in a longitudinal direction or in a lateral or transverse direction. The seat belt device may be arranged such that when a motor vehicle collides with another motor vehicle or object forward or rearward, both the shoulder belt portion and the lap belt portion constrain the occupant, and when a motor vehicle collides with another motor vehicle or object laterally, only the lap belt constrains the occupant, and the shoulder belt portion does not constrain the occupant, so that any unnecessary constraint will not be given to the occupant.

The conventional lap and diagonal seat belt device has shoulder and lap belt portions as portions of a single continuous seat belt. Therefore, both the shoulder belt portion and the lap belt portion are locked by the lock mechanism when a collision occurs irrespective of the direction of the collision. If the shoulder belt portion is locked when the motor vehicle collides laterally, then the shoulder belt portion simply serves to hold the occupant against movement. It may be considered effective to prevent the shoulder belt portion from constraining the occupant upon a lateral collision of the motor vehicle.

SUMMARY OF THE INVENTION

It is therefore an object of the present invention to provide a safety seat belt device having a mechanism for selectively locking the shoulder and lap belt portions of a seat belt depending on the direction of a motor vehicle collision and the condition in which the seat belt is fastened.

According to the present invention, there is provided a safety seat belt device for use in a motor vehicle, comprising seal belt means for constraining an occupant of the motor vehicle, the seat belt means comprising a shoulder belt portion for extending across a thorax of the occupant and a lap belt portion for extending across a lower waist of the occupant, and lock means for locking both the shoulder belt portion and the lap belt portion when the motor vehicle undergoes a forward or rearward collision, and locking only the lap belt portion when the motor vehicle undergoes a lateral collision.

According to an aspect of the present invention, the seat belt means comprises a single seat belt having a distal end fixed to a vehicle body of the motor vehicle, retractor means fixed to the vehicle body for retracting the single seat belt, a tongue, the single seat belt having an intermediate portion inserted through the tongue, and a buckle fixed to the vehicle body for holding the tongue which is inserted in the buckle, the safety belt device further comprises a first collision detector for detecting a forward or rearward collision of the motor vehicle, and a second collision detector for detecting a lateral collision of the motor vehicle, and the lock means comprises a first lock mechanism disposed in the retractor means for locking the shoulder belt portion against movement in response to a signal from the first collision detector, and a second lock mechanism disposed in at least one of the tongue and the buckle for locking the lap belt portion against movement in response to a signal from the second collision detector.

According to another aspect of the present invention, the seat belt means comprises a first seat belt having a distal end, the first seat belt serving as the shoulder belt portion, first retractor means fixed to a vehicle body of the motor vehicle for retracting the first seat belt, a second seat belt having a distal end, the second seat belt serving as the lap belt portion, second retractor means fixed to the vehicle body for retracting the second seat belt, a tongue, the distal ends of the first and second seat belts being fixed to the tongue, a buckle fixed to the vehicle body for holding the tongue which is inserted in the buckle, the safety belt device further comprises a first collision detector for detecting a forward or rearward collision of the motor vehicle, and a second collision detector for detecting a lateral collision of the motor vehicle, and the lock means comprises a first lock mechanism disposed in the first retractor means for locking the first seat belt against movement in response to a signal from the first collision detector, and a second lock mechanism disposed in the second retractor means for locking the second seat belt against movement in response to signals from the first and second collision detectors.

According to still another aspect of the present invention, the seat belt means comprises a first seat belt having a distal end, the first seat belt serving as the shoulder belt portion, first retractor means fixed to a vehicle body of the motor vehicle for retracting the first seat belt, a second seat belt having a distal end, the second seat belt serving as the lap belt portion, second retractor means fixed to the vehicle body for retracting the second seat belt, a first tongue, the distal end of the first seat belt being fixed to the first tongue, a second tongue, the distal end of the second seat belt being fixed to the second tongue, a buckle fixed to the vehicle body for holding the first and second tongues which are inserted in the buckle, the safety belt device further comprises a first collision detector for detecting a forward or rearward collision of the motor vehicle, and a second collision detector for detecting a lateral collision of the motor vehicle, and the lock means comprises a first lock mechanism disposed in the first retractor means for locking the first seat belt against movement in response to a signal from the first collision detector, and a second lock mechanism disposed in the second retractor means for locking the second seat belt against movement in response to signals from the first and second collision detectors.

Each of the lock means may include a lock mechanism for locking the shoulder belt portion upon a forward or rearward collision, and a lock mechanism for locking the lap belt portion immediately when the seat belt is fastened by the occupant regardless of whether the motor vehicle suffers a lateral collision or not.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
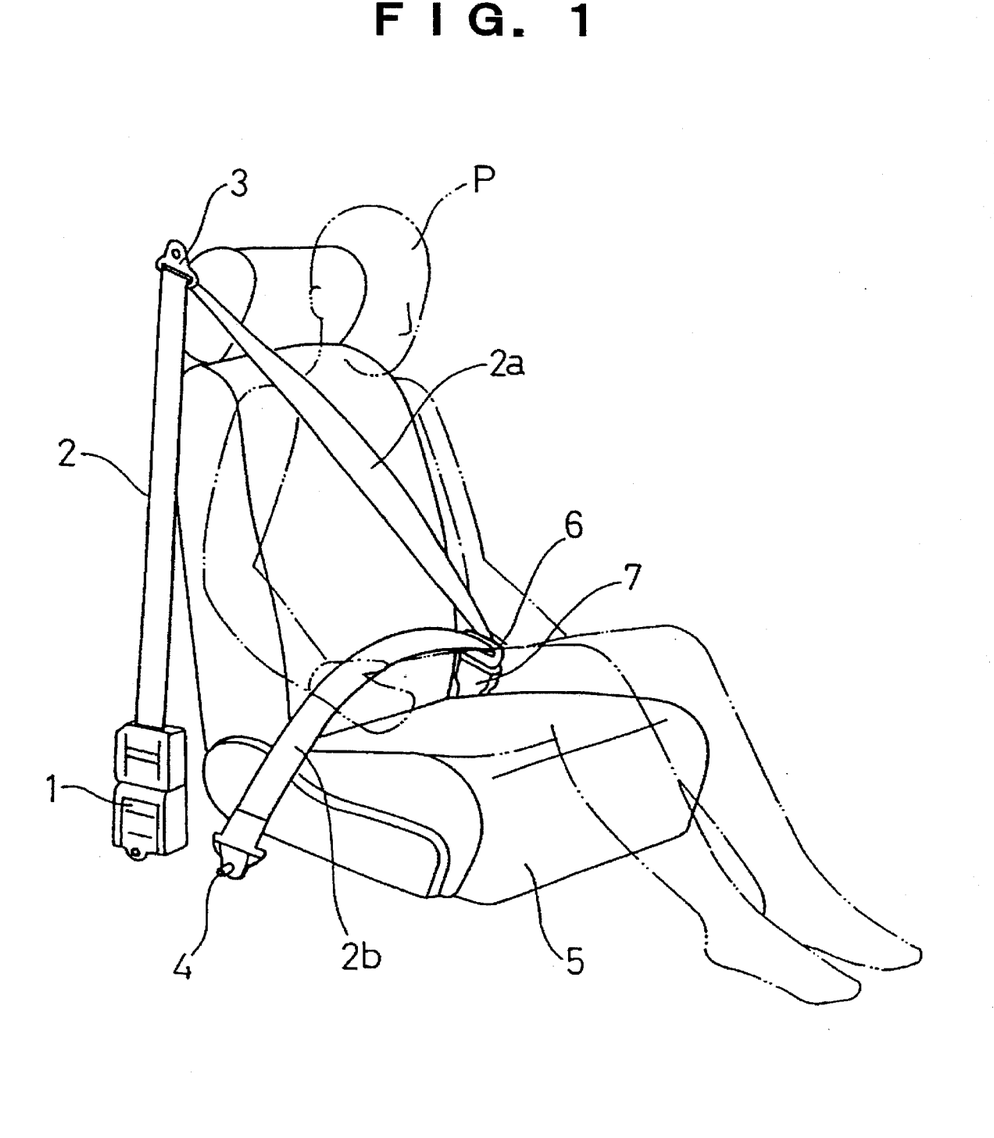
FIG. 1 is a perspective view of a basic lap and diagonal seat belt which is used in combination with the principles of the present invention.

As shown in FIG. 1, a lap and diagonal seat belt which is used in combination with the principles of the present invention has a retractor 1 fixed to a motor vehicle body below a door. A seat belt 2 is drawn from the retractor 1 against the bias of a spring disposed in the retractor 1, and passes through and is bent by a through anchor 3 fixed to the motor vehicle body above the retractor 1. The seat belt 2 has its distal end fixed through an anchor 4 to a vehicle body floor laterally of a seat 5. An intermediate portion of the seat belt 2 between the through anchor 3 and the anchor 4 is inserted through a tongue 6. When the tongue 6 is inserted in a buckle 7 positioned laterally of the seat 5 remotely from the retractor 1, the seat belt 2 has a portion extending from the through anchor 3 to the tongue 6 inserted in the buckle and serving as a shoulder belt portion 2a which extends across the thorax of an occupant P seated on the seat 5, and another portion extending from the tongue 6 to the anchor 4 and serving as a lap belt portion 2b which extends across the lower waist or hip of the occupant P.

Figure 2:
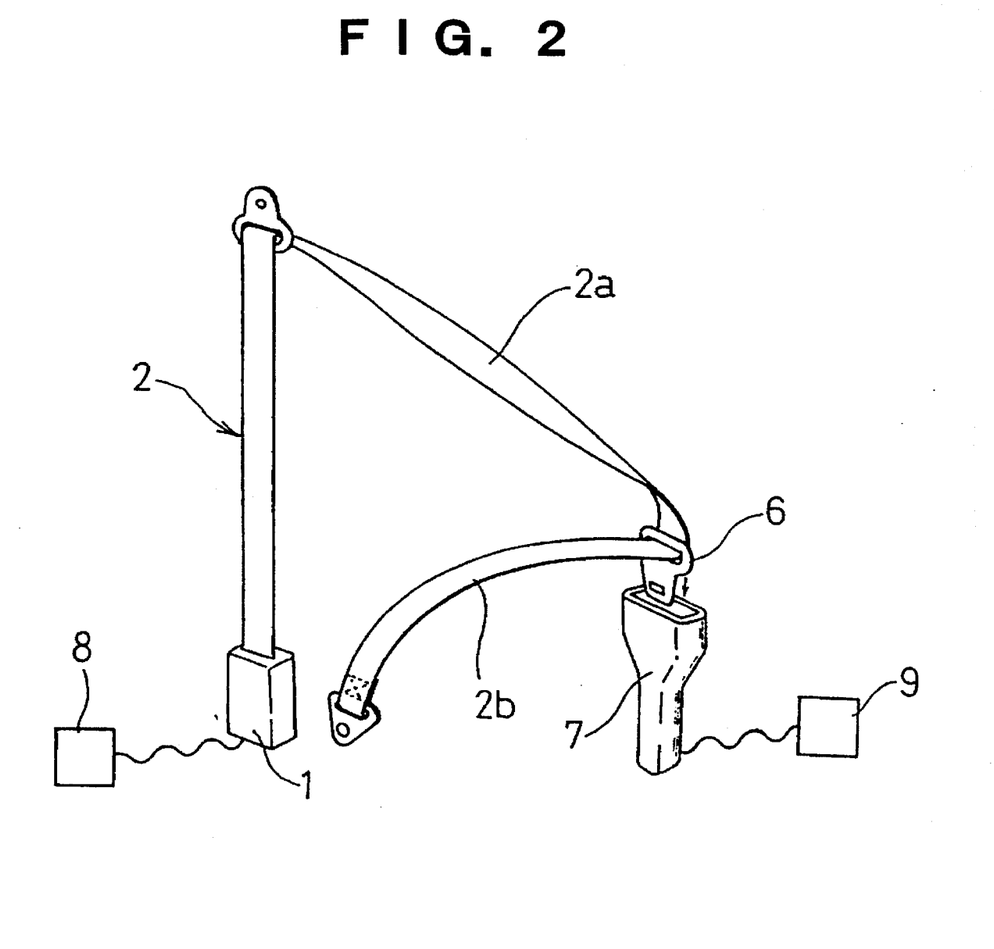
FIG. 2 is a perspective view of a safety seat belt device according to a first embodiment of the present invention.

FIG. 2 shows a safety seat belt device according to a first embodiment of the present invention. As shown in FIG. 2, the safety seat belt device according to the first embodiment includes the lap and diagonal seat belt shown in FIG. 1, a first collision detector 8 for detecting a forward or rearward collision of a motor vehicle which incorporates the safety seat belt device, and a second collision detector 9 for detecting a lateral collision of the motor vehicle. The first collision detector 8 is electrically connected to the retractor 1 by a signal line, and the second collision detector 9 is electrically connected to the buckle 7 by a signal line. The retractor 1 houses a lock mechanism for locking the seat belt against movement in response to a signal from the first collision detector 8, and at least one of the tongue 6 and the buckle 7 houses a lock mechanism for locking the seat belt against movement in response to a signal from the second collision detector 9.

The lock mechanism housed in at least one of the tongue 6 and the buckle 7 will be described below.

Figure 3:
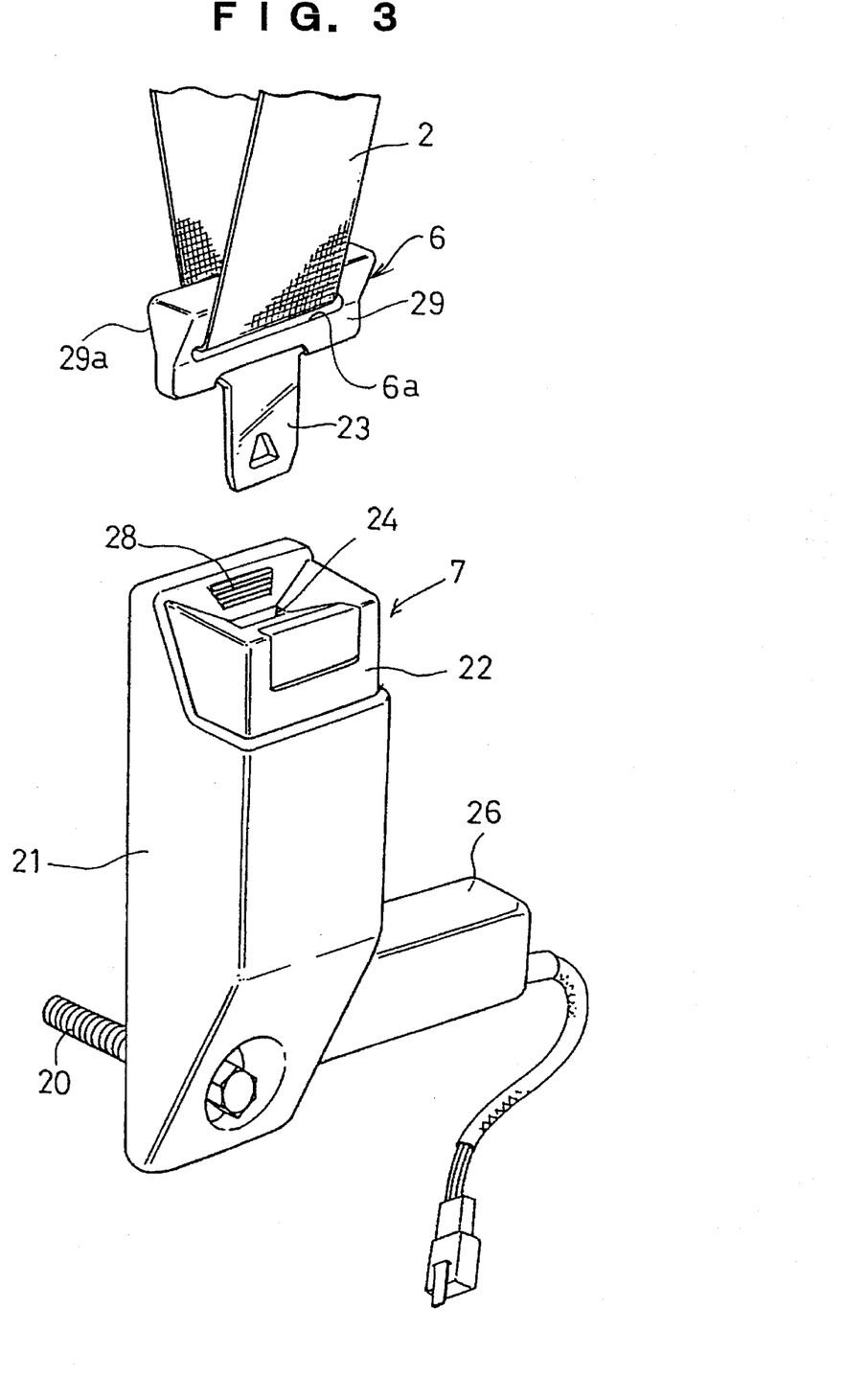
FIG. 3 is an enlarged perspective view of a tongue and a buckle having a lock mechanism in the safety seat belt device shown in FIG. 2.
Figure 4:
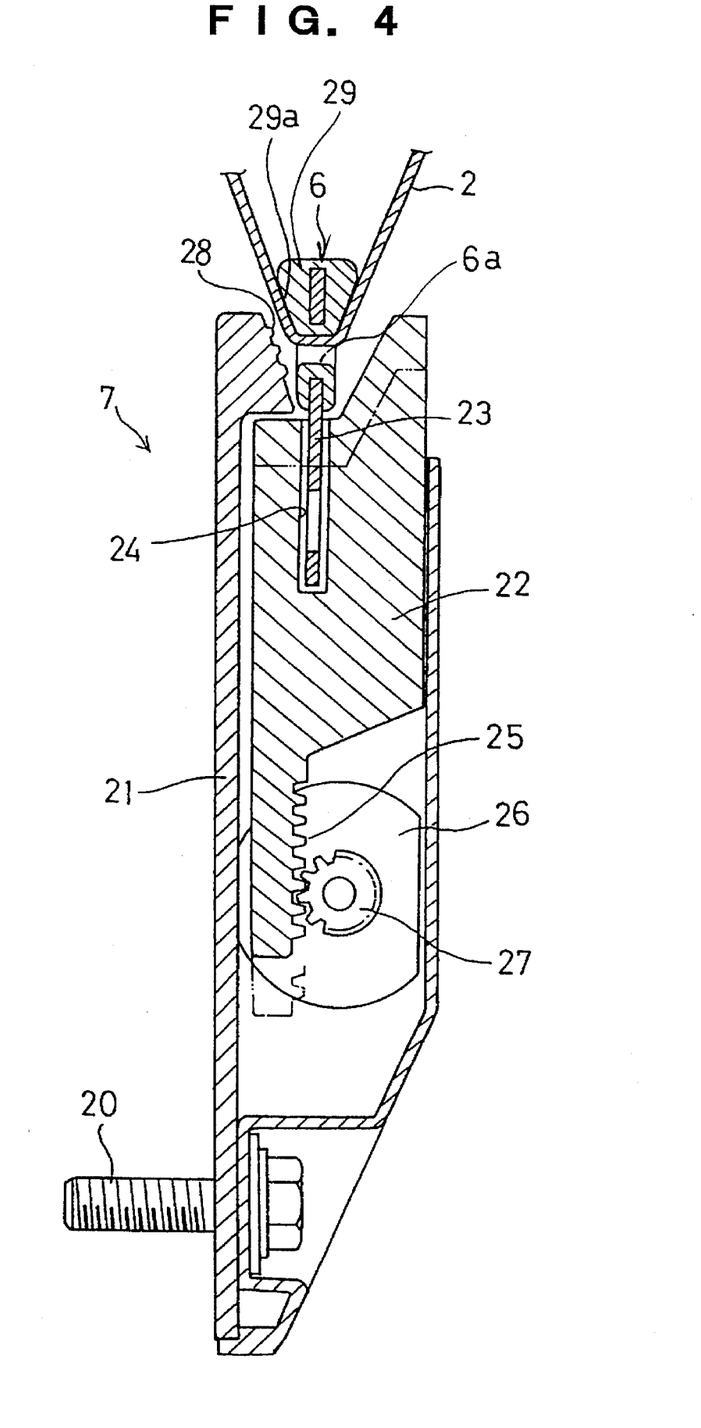
FIG. 4 is a vertical cross-sectional view of the tongue and the buckle which engage each other, showing the lock mechanism thereof.

FIGS. 3 and 4 show the lock mechanism whose major components are housed in the buckle 7. As shown in FIGS. 3 and 4, the buckle 7 has a case 21 fixed to the motor vehicle body by a bolt 20 and slider 22 slidably accommodated in an opening of the case 21.

The slider 22 has a hole 24 defined in an upper portion thereof for receiving an engaging member 23 of the tongue 6. The hole 24 is exposed out through the opening of the case 21, and the tongue 6 can be inserted into the exposed hole 24. The slider 22 has rack teeth 25 disposed on a lower portion thereof and held in mesh with a pinion 27 fixedly mounted on the rotatable shaft of a motor 26 which is housed in the case 21.

When the motor vehicle suffers a lateral collision while the tongue 6 is engaging the slider 22 as shown in FIG. 4, the motor 26 is energized in response to a signal from the second collision detector 9, thus rotating the pinion 27 which meshes with the rack teeth 25. The slider 22 is now moved downwardly in FIG. 4. The rack teeth 25, the motor 26, and the pinion 27 jointly serve as a withdrawal means for withdrawing the slider 22 into the case 21. When the withdrawal means is thus operated, the tongue 6 held by the slider 22 is lowered into the case 21 until the seat belt 2 is pressed against teeth 28 on a slant surface in the upper end of the opening of the case 21, thereby locking the seat belt 2 against movement. More specifically, the tongue 6 includes a slant member 29 with a slot 6a defined therein through which the belt 2 extends, the slat member 29 having a slant surface 29a. When the tongue 6 is lowered, the seat belt 2 is gripped and locked between the slant surface 29a and the teeth 28. The lap belt portion of the seat belt 2 is now locked against movement. The seat belt 2 is automatically unlocked several seconds after the collision of the motor vehicle. Upon a lateral collision, the lock mechanism in the retractor 1 is not actuated, and hence the shoulder lap portion of the seat belt 2 is not locked against movement.

Figure 5:
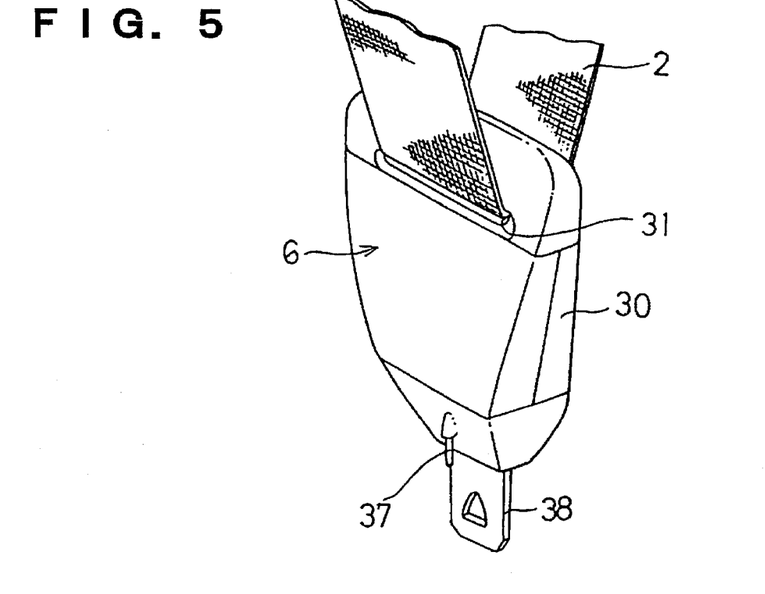
FIG. 5 is an enlarged perspective view of another tongue which can be used in the safety seat belt device shown in FIG. 2.
Figure 6:
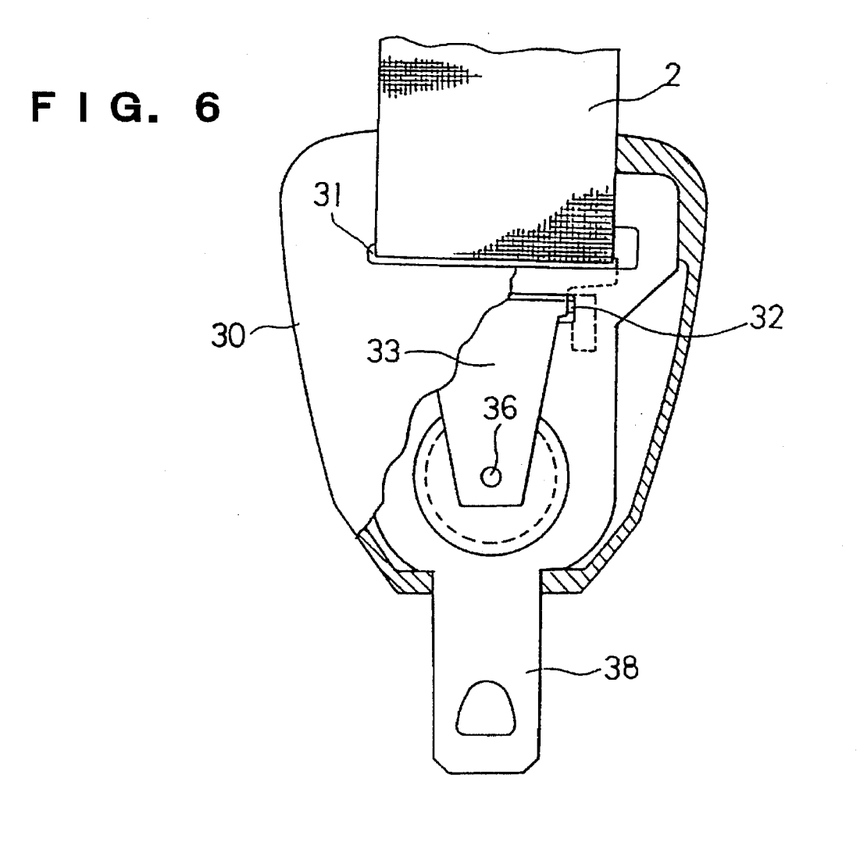
FIG. 6 is an enlarged front elevational view, partly broken away, of the tongue shown in FIG. 5.
Figure 7:
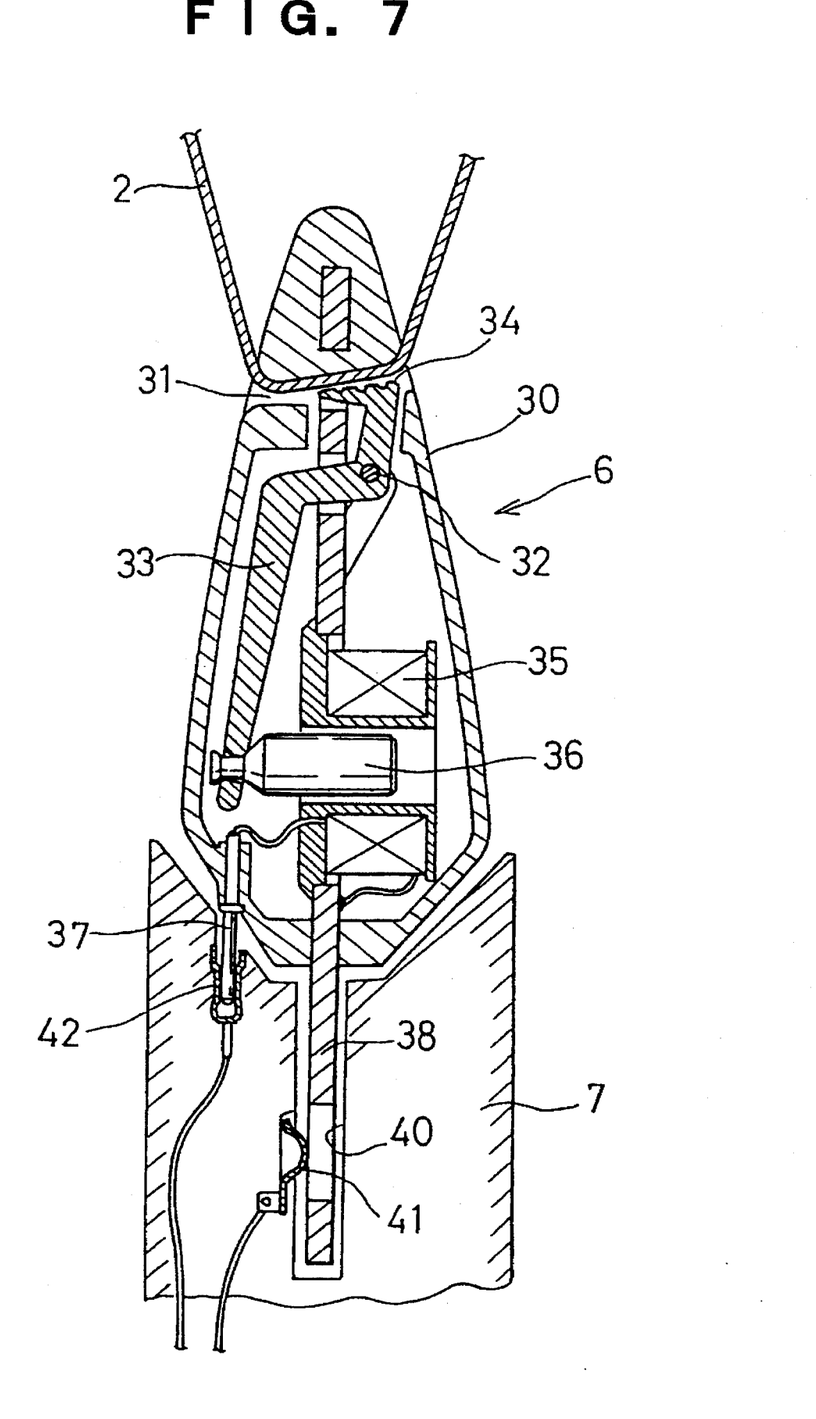
FIG. 7 is an enlarged fragmentary vertical cross-sectional view of the tongue shown in FIGS. 5 and 6 and a buckle which engage each other, showing a lock mechanism with its major components housed in the tongue.

The major components of the lock mechanism may be housed in the tongue 6, rather than the buckle 7, as shown in FIGS. 5 through 7. As shown in FIGS. 5 through 7, the tongue 6 includes a case 30 having a slot 31 defined therein for insertion of the seat belt 2 therethrough. In the case 30, there is disposed an arm 33 swingable about a pin 32 and having teeth 34 (see FIG. 7) on an upper end thereof. The arm 33 has a lower end coupled to an iron core 36 disposed in a solenoid coil 35 positioned in the case 30. The solenoid coil 35 has a terminal connected to an electric contact 37 which projects downwardly from the case 30.

The buckle 7 has a hole 40 defined therein and opening upwardly for receiving an engaging member 38 coupled to the case 30 of the tongue 6. The buckle 7 also has a leaf spring 41 projecting into the hole 40, and an electric contact 42 electrically connected to a terminal of an electric driver (not shown) for contacting the electric contact 37 when the tongue 6 is inserted in the buckle 7 as shown in FIG. 7. The leaf spring 41 is electrically connected to the other terminal of the electric driver. When the engaging member 38 which is electrically connected to the other terminal of the solenoid coil 35 is inserted into the hole 40, the leaf spring 41 is brought into contact with the engaging member 38 as shown in FIG. 7.

When the motor vehicle suffers a lateral collision while the tongue 6 is engaging the buckle 7 as shown in FIG. 7, the second detector 9 detects the collision, and the electric driver energizes the solenoid 35 in response to a signal from the second detector 9. Upon energization of the solenoid 35, the iron core 36 moves to the right in FIG. 7, turning the arm 33 counterclockwise about the pin 32. The teeth 34 are displaced into the slot 31 and press the portion of the seat belt 2 which is inserted in the slot 31, thus locking the seat belt 2 against movement. More specifically, when the solenoid 35, which serves as a swinging means for swinging the arm 33, is energized, the teeth 34 press the portion of the seat belt 2 which is inserted in the slot 31 against a wall surface of the slot 31 that confronts the teeth 34. The lap belt portion of the seat belt 2 is now locked against movement. Upon a lateral collision, the lock mechanism in the retractor 1 is not actuated, and hence the shoulder lap portion of the seat belt 2 is not locked against movement.

Figure 8:
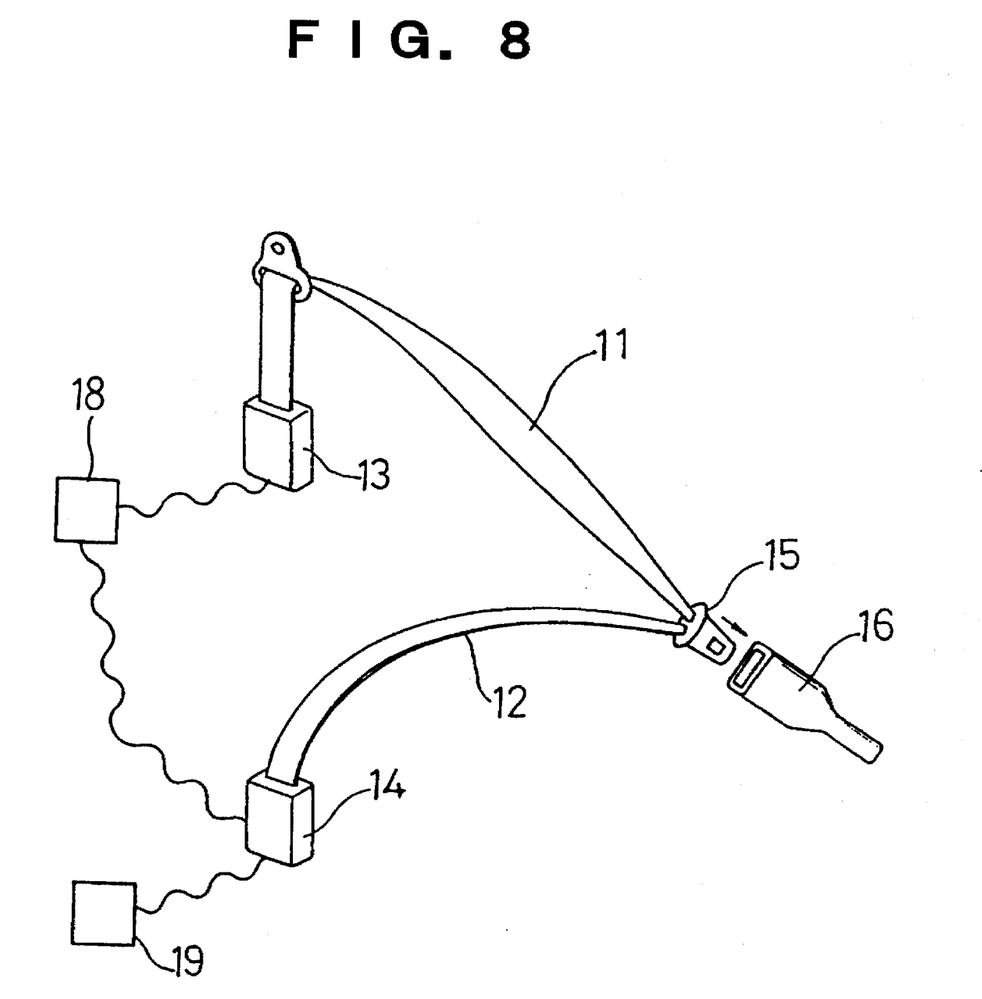
FIG. 8 is a perspective view of a safety seat belt device according to a second embodiment of the present invention.

FIG. 8 shows a safety seat belt device according to a second embodiment of the present invention. As shown in FIG. 8, the safety seat belt device comprises a first seat belt 11 and a second seat belt 12 which can be pulled from first and second retractors 13, 14, respectively. The first and second seat belts 11, 12 have respective distal ends fixed to a single tongue 15. When the tongue 15 is inserted in a buckle 16, the first seat belt 11 serves as a shoulder belt portion, and the second seat belt 12 as a lap belt portion. Each of the first and second retractors 13, 14 has a lock mechanism housed therein.

The safety seat belt device shown in FIG. 8 also includes a first collision detector 18 for detecting a forward or rearward collision of a motor vehicle which incorporates the safety seat belt device, and a second collision detector 19 for detecting a lateral collision of the motor vehicle. The lock mechanism in the first retractor 13 is electrically connected to the first collision detector 18 by a signal line, and the lock mechanism in the second retractor 14 is electrically connected to the first and second collision detectors 18, 19 by signal lines.

When the motor vehicle collides with a motor vehicle or object forward or rearward, both the first and second seat belts 11, 12 are locked by the respective lock mechanisms in the first and second retractors 13, 14. When the motor vehicle collides with a motor vehicle or object laterally, the first seat belt 11 is not locked by the lock mechanism in the first retractor 13, but only the second seat belt 12 is locked by the lock mechanism in the second retractor 14.

Figures 9, 10:
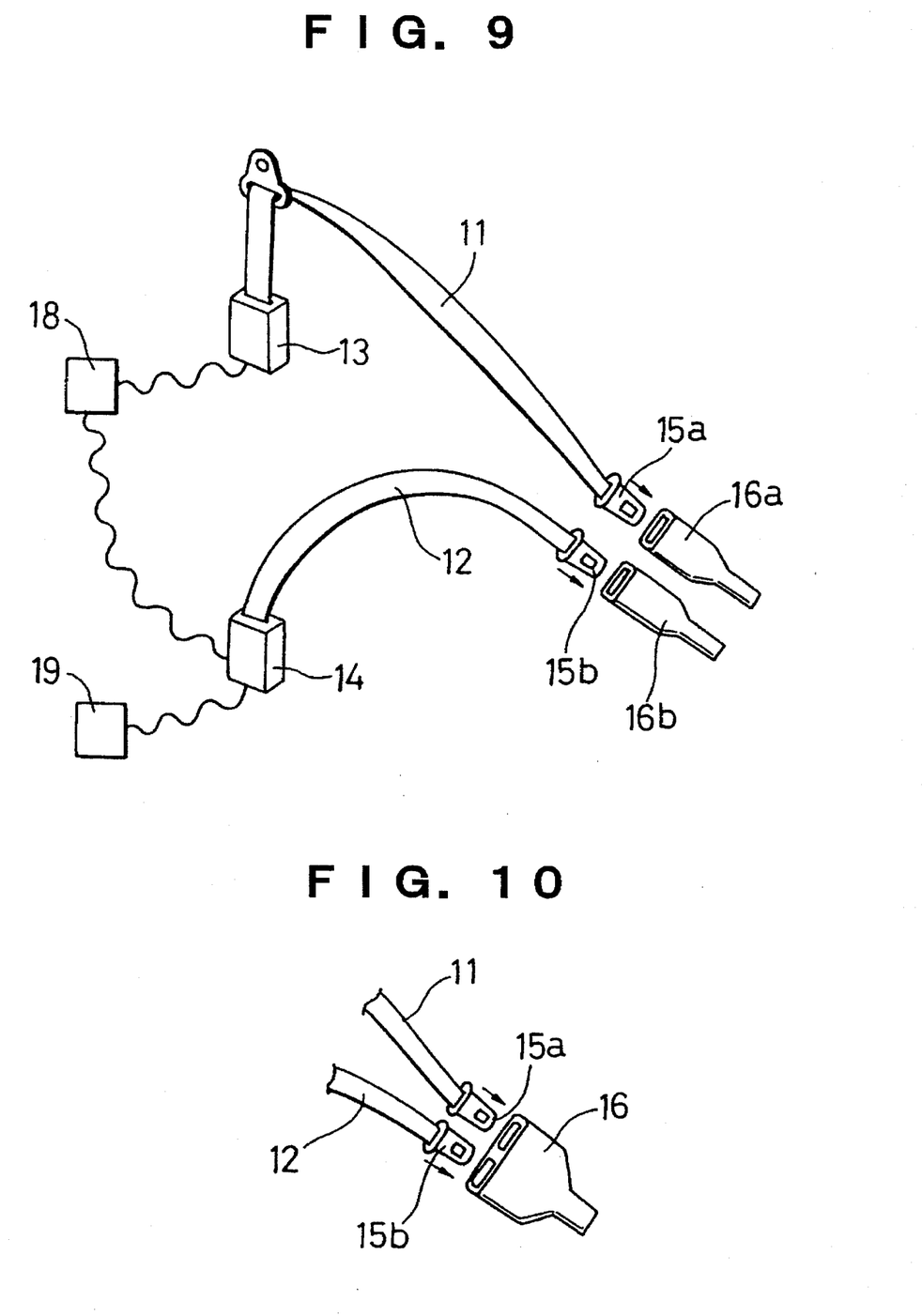
FIG. 9 is a perspective view of a safety seat belt device according to a third embodiment of the present invention.
FIG. 10 is a perspective view of a modified buckle that can be used in the safety seat belt device shown in FIG. 9.

FIG. 9 shows a safety seat belt device according to a third embodiment of the present invention. As shown in FIG. 9, the safety seat belt device comprises a first seat belt 11 serving as a shoulder belt portion and a second seat belt 12 serving as a lap belt portion. The first and second seat belts 11, 12 can be pulled from the first and second retractors 13, 14, respectively. The first and second seat belts 11, 12 have respective distal ends fixed to respective tongues 15a, 15b, which are individually inserted into respective buckles 16a, 16b fixed to the motor vehicle body. Each of the first and second retractors 13, 14 has a lock mechanism housed therein.

The safety seat belt device shown in FIG. 9 also includes a first collision detector 18 for detecting a forward or rearward collision of a motor vehicle which incorporates the safety seat belt device, and a second collision detector 19 for detecting a lateral collision of the motor vehicle. The lock mechanism in the first retractor 13 is electrically connected to the first collision detector 18 by a signal line, and the lock mechanism in the second retractor 14 is electrically connected to the first and second collision detectors 18, 19 by signal lines.

When the motor vehicle collides with a motor vehicle or object forward or rearward, both the first and second seat belts 11, 12 are locked by the respective lock mechanisms in the first and second retractors 13, 14. When the motor vehicle collides with a motor vehicle or object laterally, the first seat belt 11 is not locked by the lock mechanism in the first retractor 13, but only the second seat belt 12 is locked by the lock mechanism in the second retractor 14.

FIG. 10 shows a modified buckle that can be used in the safety seat belt device shown in FIG. 9. As shown in FIG. 10, a single buckle 16 has two holes defined respectively therein for inserting the tongues 15a, 15b respectively therein.

Figure 11:
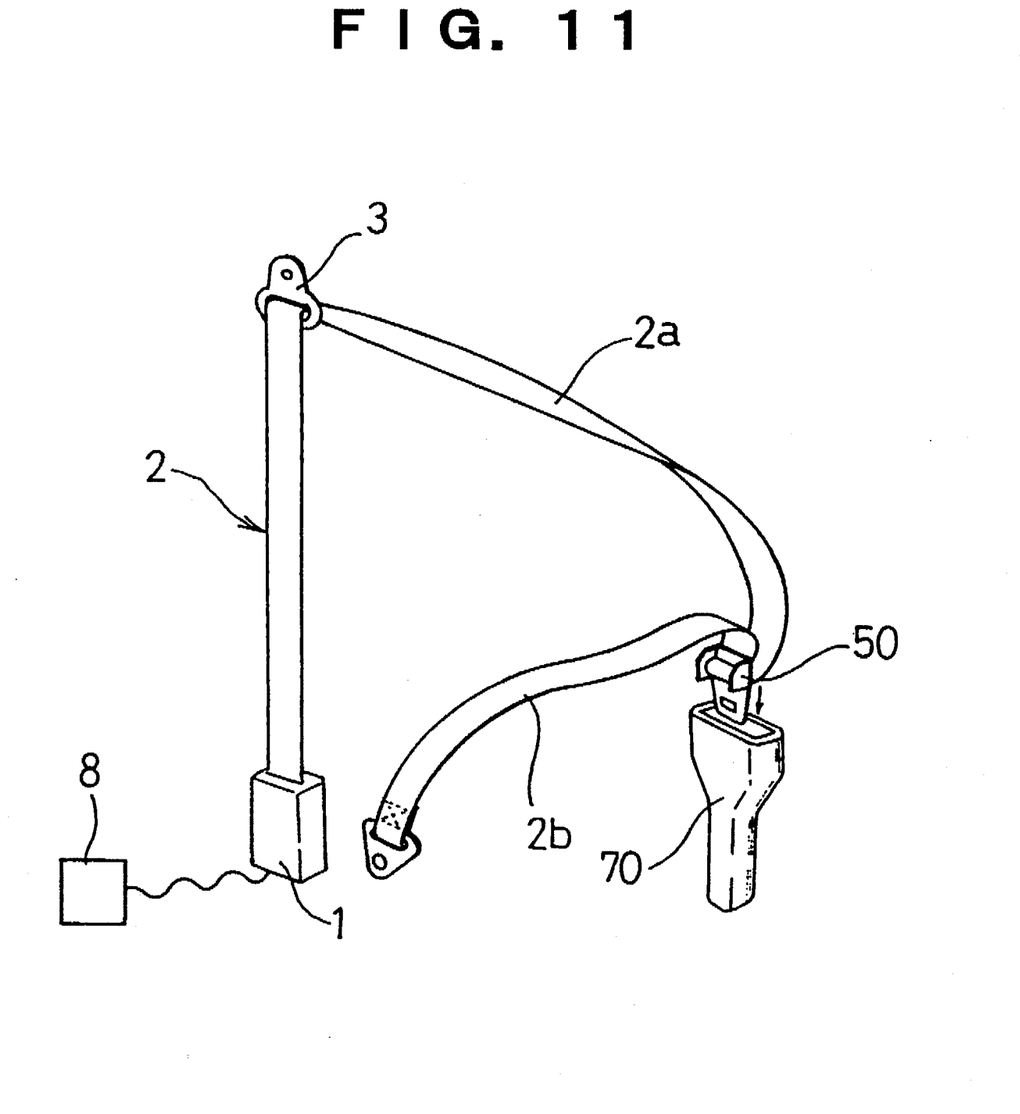
FIG. 11 is a perspective view of a safety seat belt device according to a fourth embodiment of the present invention.

FIG. 11 shows a safety seat belt device according to a fourth embodiment of the present invention. As shown in FIG. 11, the safety seat belt device according to the fourth embodiment includes a lap and diagonal seat belt as shown in FIG. 1. A seat belt 2 is drawn from a retractor 1 and passes through and is bent by a through anchor 3. The seat belt 2 has its distal end fixed to a vehicle body floor. An intermediate portion of the seat belt 2 is inserted through a tongue 50. When the tongue 50 is inserted in a buckle 70, the seat belt 2 has a portion serving as a shoulder belt portion 2a and another portion serving as a lap belt portion 2b. The retractor 1 has a lock mechanism housed therein which is electrically connected by a signal line to a first collision detector 8 for detecting a forward or rearward collision of a motor vehicle which incorporates the safety seat belt device. In response to a signal from the first collision detector 8, the lock mechanism in the retractor 1 is actuated to lock the seat belt 2 against movement.

In the fourth embodiment, the tongue 50 has a lock mechanism for locking the lap belt portion 2b while the seat belt 2 is fastened with the tongue 50 inserted in the buckle 70.

Figure 12:
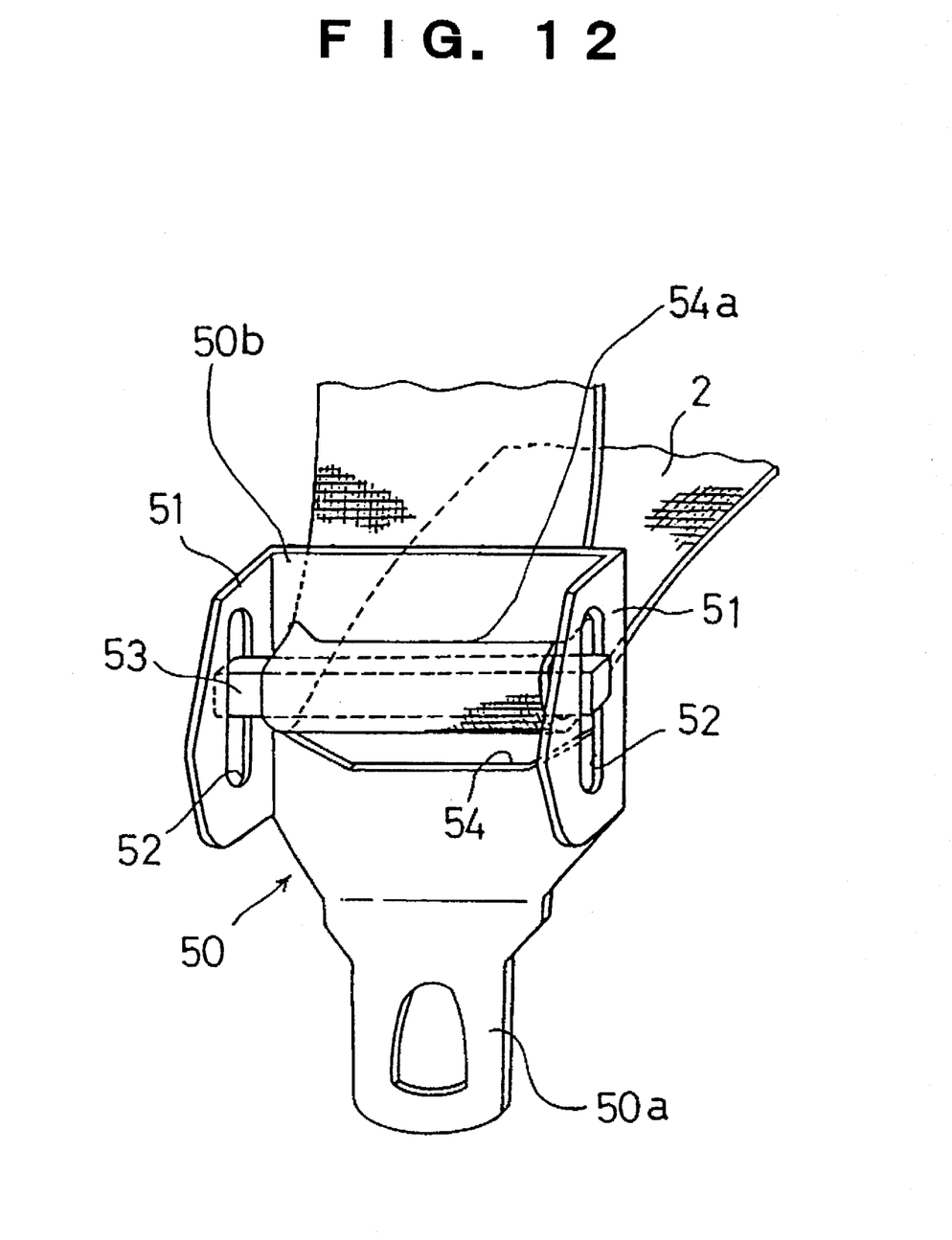
FIG. 12 is an enlarged perspective view of a tongue of the safety seat belt device shown in FIG. 11.

FIG. 12 shows in enlarged perspective the tongue 50 of the safety seat belt device shown in FIG. 11. The tongue 50 is substantially in the form of a plate including a lower portion 50a serving as an engaging member which can be inserted and retained in the buckle 7, and an upper portion 50b bent into a channel shape including a pair of opposite arms 51 having respective slits 52 defined therein. A rod 53 having a rectangular cross section extends between the arms 51 and has opposite ends inserted respectively in the slits 52 so that the rod 53 is slidably retained by the arms 51. The upper portion 50b also has an opening 54 defined therein between the arms 51, the opening 54 having an upper edge 54a for engaging the belt 2. The belt 2 is inserted into the tongue 50 from the side of the tongue 50 remote from the rod 53 through the opening 54, is turned around the rod 53, and extends through the opening 54 to the side of the tongue 50 remote from the rod 53.

Figure 13A:
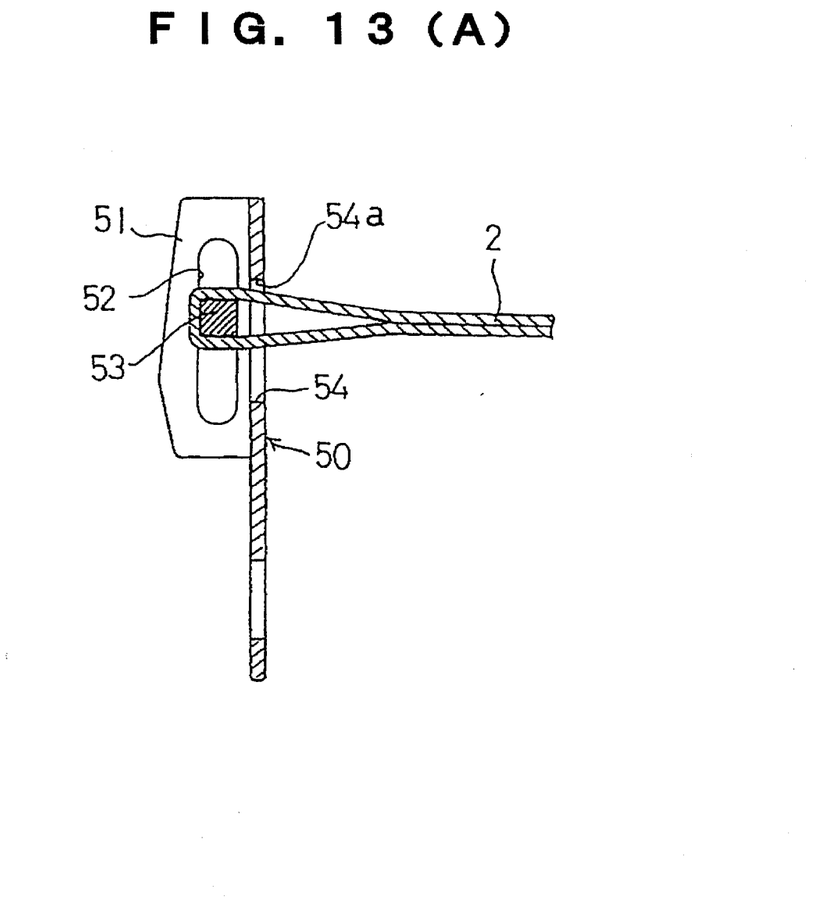
FIG. 13(A) is a cross-sectional view of the tongue of the safety seat belt device shown in FIG. 11, the tongue being shown as being unlocked.

When the tongue 50 is directed substantially perpendicularly to the seat belt 2 as shown in FIG. 13(A), i.e., when the tongue 50 is not inserted in the buckle 70, the seat belt 2 can move freely with respect to the tongue 50.

Figure 13B:
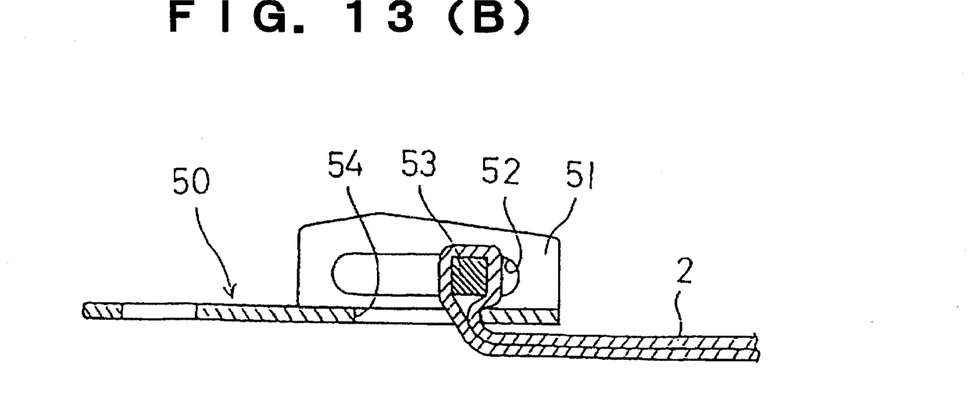
FIG. 13(B) is a cross-sectional view of the tongue of the safety seat belt device shown in FIG. 11, the tongue being shown as being locked.

When the tongue 50 is directed substantially parallel to the seat belt 2 as shown in FIG. 13(B), i.e., when the tongue 50 is inserted in the buckle 70, as the rod 53 moves along the slits 52 toward the edge 54a, the seat belt 2 is tensioned and locked by frictional engagement thereof with the rod 53 and the edge 54a.

The shoulder belt portion 2a is locked against movement by the lock mechanism in the retractor 1 when the motor vehicle undergoes a forward or rearward collision. The lap belt portion 2b is locked at all times when the tongue 50 is inserted in the buckle 70.

Figure 14:
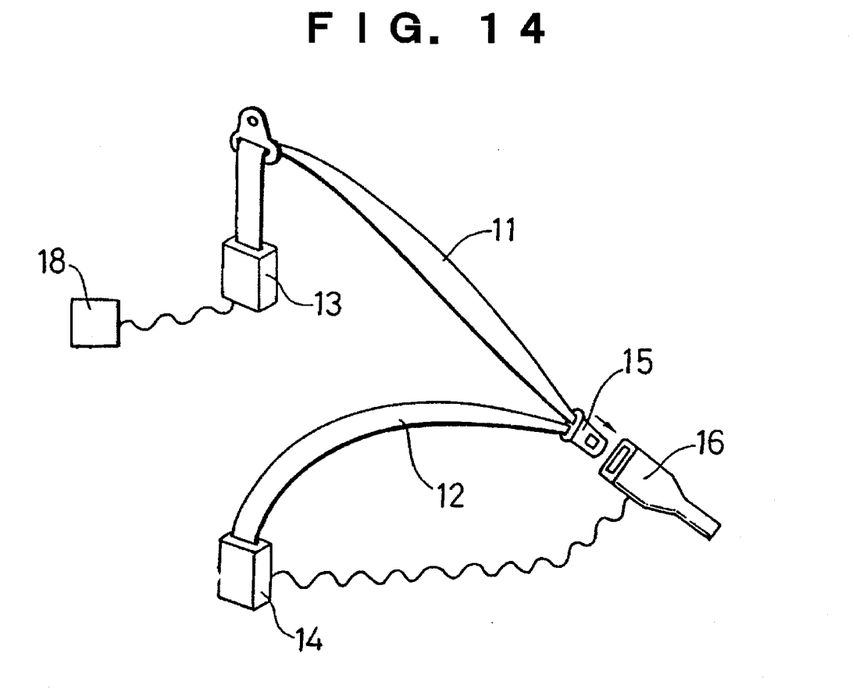
FIG. 14 is a perspective view of a safety seat belt device according to a fifth embodiment of the present invention.

FIG. 14 shows a safety seat belt device according to a fifth embodiment of the present invention. As shown in FIG. 14, the safety seat belt device comprises a first seat belt 11 serving as a shoulder belt portion and a second seat belt 12 serving as a lap belt portion. The first and second seat belts 11, 12 can be pulled from respective first and second retractors 13, 14, and have respective distal ends fixed to a single tongue 15 which can be inserted into a buckle 16. Each of the first and second retractors 13, 14 has a lock mechanism housed therein.

The safety seat belt device shown in FIG. 14 also includes a collision detector 18 for detecting a forward or rearward collision of a motor vehicle which incorporates the safety seat belt device. The collision detector 18 is electrically connected to the lock mechanism in the first retractor 13. The buckle 16 has a tongue insertion detector for detecting when the tongue 15 is inserted into the buckle 16. The tongue insertion detector is electrically connected to the lock mechanism in the second retractor 14.

When the first and second seat belts 11, 12 are fastened, i.e., when the tongue 15 is inserted in the buckle 16, the tongue insertion detector in the buckle 16 applies a signal to cause the lock mechanism in the second retractor 14 to lock the second seat belt 12. When the motor vehicle undergoes a forward or rearward collision, the collision detector 18 applies a signal to cause the lock mechanism in the first retractor 13 to lock the first seat belt 11. Therefore, both the first and second seat belts 11, 12 are locked. However, when the motor vehicle undergoes a lateral collision, the first seat belt 11 is not locked.

Figure 15:
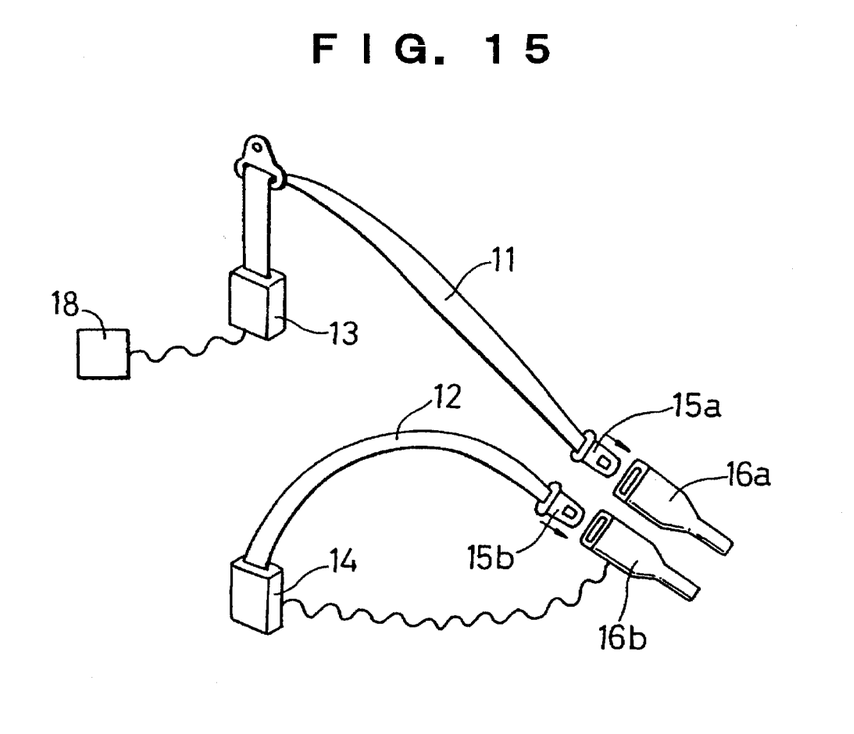
FIG. 15 is a perspective view of a safety seat belt device according to a sixth embodiment of the present invention.

FIG. 15 shows a safety seat belt device according to a sixth embodiment of the present invention. As shown in FIG. 15, the safety seat belt device comprises first and second seat belts 11, 12 which have respective distal ends fixed to respective tongues 15a, 15b which can be inserted into respective buckles 16a, 16b. Each of the first and second retractors 13, 14 has a lock mechanism housed therein. The safety seat belt device shown in FIG. 15 also includes a collision detector 18 for detecting a forward or rearward collision of a motor vehicle which incorporates the safety seat belt device. The collision detector 18 is electrically connected to the lock mechanism in the first retractor 13. The buckle 16b has a tongue insertion detector for detecting when the tongue 15b is inserted into the buckle 16b. The tongue insertion detector is electrically connected to the lock mechanism in the second retractor 14. When the first and second seat belts 11, 12 are fastened, the tongue insertion detector in the buckle 16b applies a signal to cause the lock mechanism in the second retractor 14 to lock the second seat belt 12.

Locked and unlocked conditions of the seat belts of the safety seat belt devices according to the first through sixth embodiments upon motor vehicle collisions are summarized in the following table:

TABLE

|  |  | Normal | Forward or rearward collision | Lateral collision |
| --- | --- | --- | --- | --- |
| 1st Embodiment | Retractor | Unlocked | Locked | Unlocked |
|  | Tongue | Unlocked | Unlocked | Locked |
| 2nd Embodiment | 1st Retractor | Unlocked | Locked | Unlocked |
|  | 2nd Retractor | Unlocked | Locked | Locked |
| 3rd Embodiment | 1st Retractor | Unlocked | Locked | Unlocked |
|  | 2nd Retractor | Unlocked | Locked | Locked |
| 4th Embodiment | Retractor | Unlocked | Locked | Unlocked |
|  | Tongue | Locked | Locked | Locked |
| 5th Embodiment | 1st Retractor | Unlocked | Locked | Unlocked |
|  | 2nd Retractor | Locked | Locked | Locked |
| 6th Embodiment | 1st Retractor | Unlocked | Locked | Unlocked |
|  | 2nd Retractor | Locked | Locked | Locked |

With the above arrangement of the present invention, the shoulder and lap belt portions of the lap and diagonal seat belt are selectively lockable such that both the shoulder and lap belt portions are locked upon a forward or rearward collision, and the shoulder belt portion is not locked, but only the lap belt portion is locked upon a lateral collision. Consequently, the occupant is not constrained undesirably upon a lateral collision.

Although there have been described what are at present considered to be the preferred embodiments of the invention, it will be understood that the invention may be embodied in other specific forms without departing from the essential characteristics thereof. The present embodiments are therefore to be considered in all respects as illustrative, and not restrictive. The scope of the invention is indicated by the appended claims rather than by the foregoing description.

What is claimed is:

1. A safety seat belt device for use in a motor vehicle, comprising:

seat belt means for constraining an occupant of the motor vehicle, said seat belt means comprising a shoulder belt portion for extending across a thorax of the occupant and a lap belt portion for extending across a lower waist of the occupant; and     lock means for locking at least the shoulder belt portion against movement when the motor vehicle undergoes a forward or rearward collision, and locking only the lap belt portion when the motor vehicle undergoes a lateral collision.

2. A safety seat belt device according to claim 1, wherein said seat belt means comprises:

a single seat belt having a distal end fixed to a vehicle body of the motor vehicle;

retractor means fixed to the vehicle body for retracting said single seat belt;

a tongue, said single seat belt having an intermediate portion inserted through said tongue; and a buckle fixed to the vehicle body for holding the tongue which is inserted in said buckle;

said safety belt device further comprising:

a first collision detector for detecting a forward or rearward collision of the motor vehicle; and a second collision detector for detecting a lateral collision of the motor vehicle; and wherein said lock means comprises:

a first lock mechanism disposed in said retractor means for locking said shoulder belt portion against movement in response to a signal from said first collision detector; and a second lock mechanism disposed in at least one of said tongue and said buckle for locking said lap belt portion against movement in response to a signal from said second collision detector.

3. A safety seat belt device according to claim 2, wherein said buckle comprises:

a case fixed to the vehicle body and having at least one opening defined therein;

a slider having a hole defined therein for holding said tongue which partially engages in said hole, said slider being slidably housed in said case with said hole being exposed out through said opening; and withdrawal means for withdrawing said slider into said case; and wherein said second lock mechanism comprises at least said slider, said withdrawal means, and teeth disposed in said opening, the arrangement being such that when said withdrawal means is actuated in response to a signal from said second collision detector, said withdrawal means withdraws said slider into said case while the slider is holding said tongue and presses a portion of the seat belt which is inserted in said tongue against said teeth, for thereby locking said lap belt portion against movement.

4. A safety seat belt device according to claim 2, wherein said tongue comprises:

a case having a slot defined therein, said seat belt being inserted in said slot;

a pin disposed in said case;

an arm disposed in said case and swingably supported on said pin, said arm having teeth on one end thereof movable into said slot;

swinging means disposed in said case and coupled to an opposite end of said arm for swinging said arm about said pin; and an engaging member coupled to said case for being inserted in and held by said buckle; and wherein said second lock mechanism comprises at least said pin, said arm, and said swinging means, the arrangement being such that when said swinging means is actuated in response to a signal from said second collision detector, said swinging means swings said arm to displace said teeth into said slot to press a portion of the seat belt which is inserted in said slot, for thereby locking said lap belt portion against movement.

5. A safety seat belt device according to claim 1, wherein said seat belt means comprises:

a first seat belt having a distal end, said first seat belt serving as said shoulder belt portion;

first retractor means fixed to a vehicle body of the motor vehicle for retracting said first seat belt;

a second seat belt having a distal end, said second seat belt serving as said lap belt portion;

second retractor means fixed to the vehicle body for retracting said second seat belt;

a tongue, said distal ends of said first and second seat belts being fixed to said tongue;

a buckle fixed to the vehicle body for holding the tongue which is inserted in said buckle;

said safety belt device further comprising:

a first collision detector for detecting a forward or rearward collision of the motor vehicle; and a second collision detector for detecting a lateral collision of the motor vehicle; and wherein said lock means comprises:

a first lock mechanism disposed in said first retractor means for locking said first seat belt against movement in response to a signal from said first collision detector; and a second lock mechanism disposed in said second retractor means for locking said second seat belt against movement in response to either one of a signal from said first collision detector or a signal from said second collision detector.

6. A safety seat belt device according to claim 1, wherein said seat belt means comprises:

a first seat belt having a distal end, said first seat belt serving as said shoulder belt portion;

first retractor means fixed to a vehicle body of the motor vehicle for retracting said first seat belt;

a second seat belt having a distal end, said second seat belt serving as said lap belt portion;

second retractor means fixed to the vehicle body for retracting said second seat belt;

a first tongue, said distal end of said first seat belt being fixed to said first tongue;

a second tongue, said distal end of said second seat belt being fixed to said second tongue;

a buckle fixed to the vehicle body for holding the first and second tongues which are inserted in said buckle;

said safety belt device further comprising:

a first collision detector for detecting a forward or rearward collision of the motor vehicle; and a second collision detector for detecting a lateral collision of the motor vehicle; and wherein said lock means comprises:

a first lock mechanism disposed in said first retractor means for locking said first seat belt against movement in response to a signal from said first collision detector; and a second lock mechanism disposed in said second retractor means for locking said second seat belt against movement in response to either one of a signal from said first collision detector or a signal from said second collision detector.

7. A safety seat belt device for use in a motor vehicle, comprising:

a constraining system for an occupant of the motor vehicle, said constraining system comprising:

a single seat belt having a distal end fixed to a vehicle body of the motor vehicle, and comprising a shoulder belt portion for extending across a thorax of the occupant and a lap belt portion for extending across a lower waist of the occupant;

a retractor fixed to the vehicle body for retracting the single seat belt;

a tongue, said single seat belt having an intermediate portion that passes through said tongue; and a buckle fixed to the vehicle body, into which the tongue is inserted;

a collision detector for detecting a forward or rearward collision of the motor vehicle;

a first lock mechanism disposed in said retractor for locking said shoulder belt portion of said single seat belt against movement in response to a signal from said collision detector when said constraining system is fastened by the occupant with the tongue being inserted and held in the buckle; and a second lock mechanism provided with at least one of said tongue and said buckle for locking only said lap belt portion against movement when said constraining system is fastened by the occupant with the tongue being inserted and held in the buckle.

8. A safety seat belt device according to claim 7, wherein said tongue comprises a plate having an engaging member which can be inserted and held in said tongue, and an opening defined therein which has an edge for engaging said seat belt, and a rod of rectangular cross section slidably supported on one surface of said plate, said seat belt being inserted from another surface of said plate remote from said rod through said opening, being turned around said rod, and extending through said opening to the other surface of said plate, said second lock mechanism comprising at least said edge and said rod, the arrangement being such that when said tongue is inserted in said buckle, said rod is displaced toward said edge and said seat belt is tensioned to lock the seat belt in frictional engagement with said rod and said edge.

* * * * *